United States Patent
Johnson et al.

(10) Patent No.: US 10,677,472 B2
(45) Date of Patent: Jun. 9, 2020

(54) CONTROL METHOD FOR OVEN BROILING

(71) Applicant: General Electric Company, Schenectady, NY (US)

(72) Inventors: Eric Scott Johnson, Louisville, KY (US); Sabrina Marie Hannah, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 928 days.

(21) Appl. No.: 15/079,078

(22) Filed: Mar. 24, 2016

(65) Prior Publication Data

US 2017/0276375 A1 Sep. 28, 2017

(51) Int. Cl.
*F24C 7/08* (2006.01)
*G05D 23/19* (2006.01)

(52) U.S. Cl.
CPC ......... *F24C 7/088* (2013.01); *G05D 23/1919* (2013.01)

(58) Field of Classification Search
CPC .. F24C 7/085; F24C 7/087; F24C 7/08; F24C 7/082; F24C 7/088; F24C 7/083; F24C 7/06; F24C 7/04; F24C 7/081; G05D 23/1854; G05D 23/1904; G05D 23/1919; G05D 23/1931
USPC ....... 219/412, 400, 413, 480, 492, 391, 398, 219/494, 393, 395, 402, 408, 409, 410, 219/411, 476, 477, 483, 486, 490, 497, 219/510, 685, 739; 99/342, 337, 325, 99/468, 284, 290, 291, 300, 305, 327, 99/330, 331, 332, 333, 336, 344, 348, 99/357, 389, 403, 410, 447, 451, 467, 99/474, 483, 484, 486; 126/273 R, 19 R, 126/21 A, 39 R, 39 G, 20, 21 R, 214 D, 126/263.01, 39 BA, 39 E, 41 R, 52; 392/416, 310, 418, 422
See application file for complete search history.

(56) References Cited

U.S. PATENT DOCUMENTS

| | | | |
|---|---|---|---|
| 6,570,136 B1 * | 5/2003 | Lockwood | F24C 7/082 219/398 |
| 6,756,570 B2 | 6/2004 | Sauter | |
| 2008/0011736 A1 * | 1/2008 | Lenhart | F24C 1/04 219/412 |
| 2013/0146581 A1 | 6/2013 | Donarski et al. | |
| 2015/0276229 A1 * | 10/2015 | Cadima | F24C 3/128 126/39 G |
| 2016/0040892 A1 * | 2/2016 | Wiseman | F24C 15/322 219/412 |
| 2016/0324360 A1 * | 11/2016 | Boedicker | F24C 7/08 |

* cited by examiner

*Primary Examiner* — Serkan Akar
*Assistant Examiner* — Chris Q Liu
(74) *Attorney, Agent, or Firm* — Dority & Manning, P.A.

(57) ABSTRACT

A system and method for preheating a cooking chamber of an oven appliance is provided. The oven appliance may include one or more heating elements that operate according to a control algorithm that prevents the center oven temperature from exceeding a maximum desired temperature threshold. The control algorithm accounts for discrepancies between the measured oven temperature and the actual center oven temperature, particularly when preheating a cold oven. As a result, the control algorithm selectively operates one or more of the heating elements after the measured oven temperature is above the maximum desired temperature threshold. Preheating the cooking chamber in this manner will improve overall cooking performance.

13 Claims, 7 Drawing Sheets

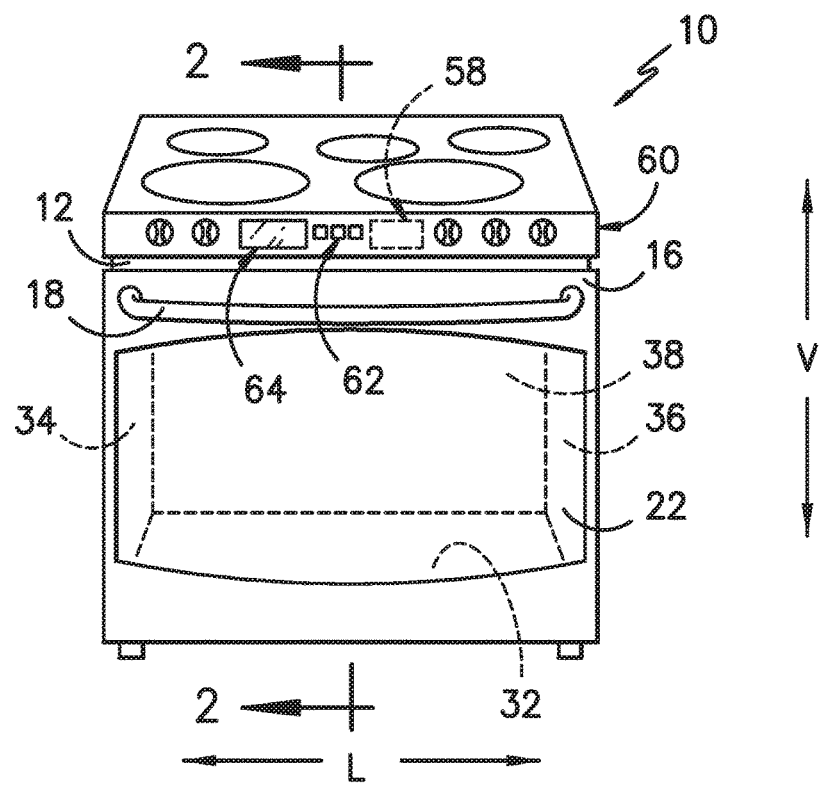
FIG. -1-
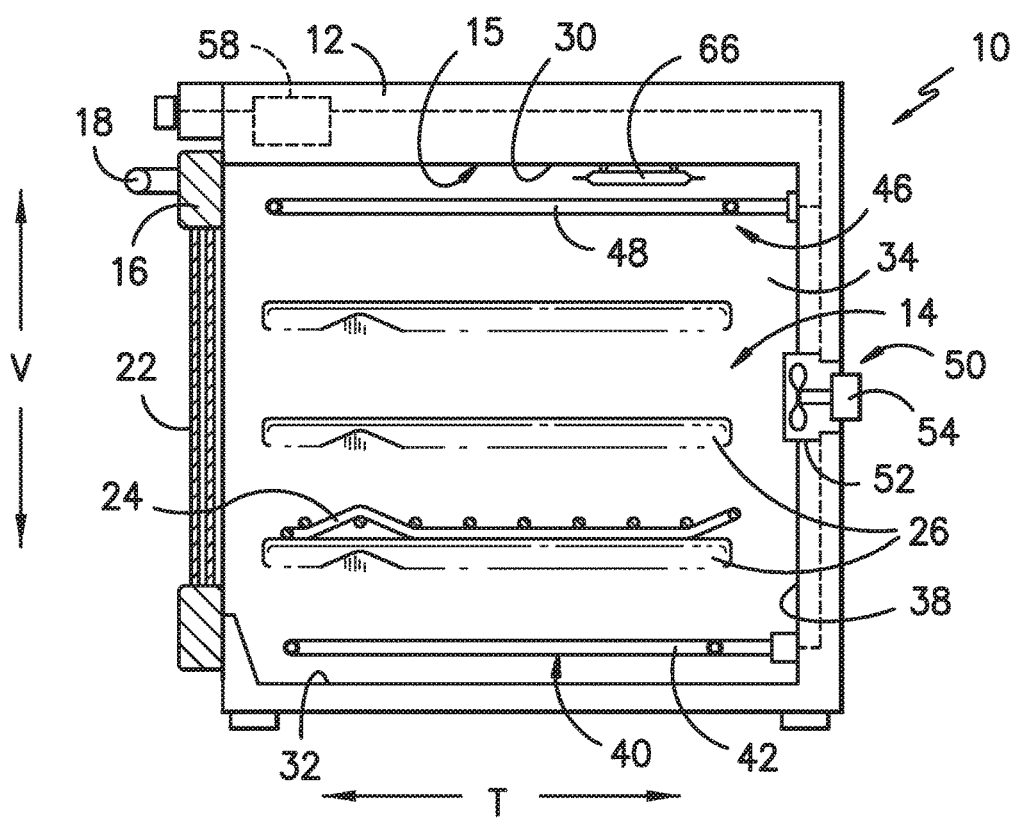
FIG. -2-

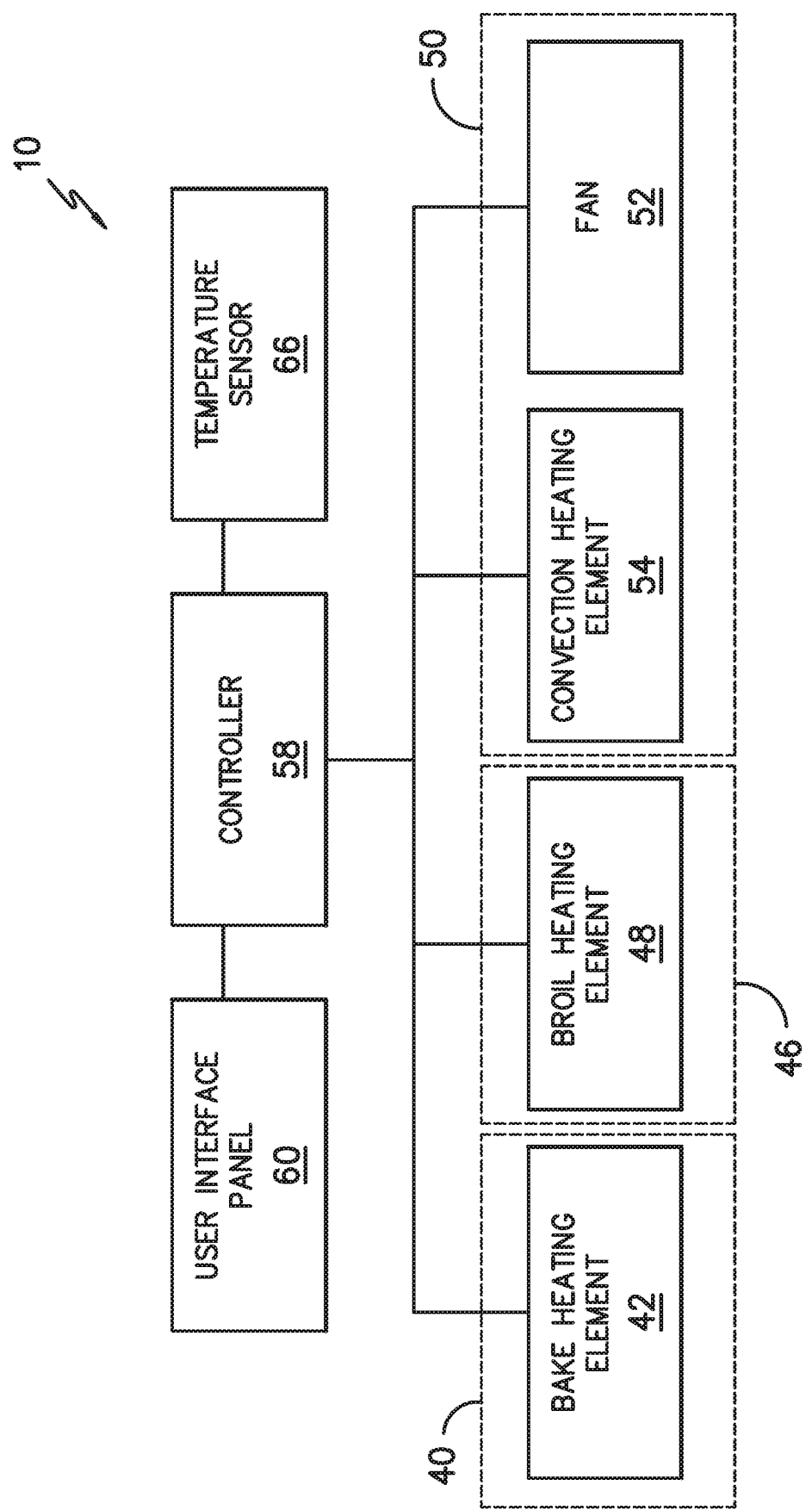
FIG. -3-

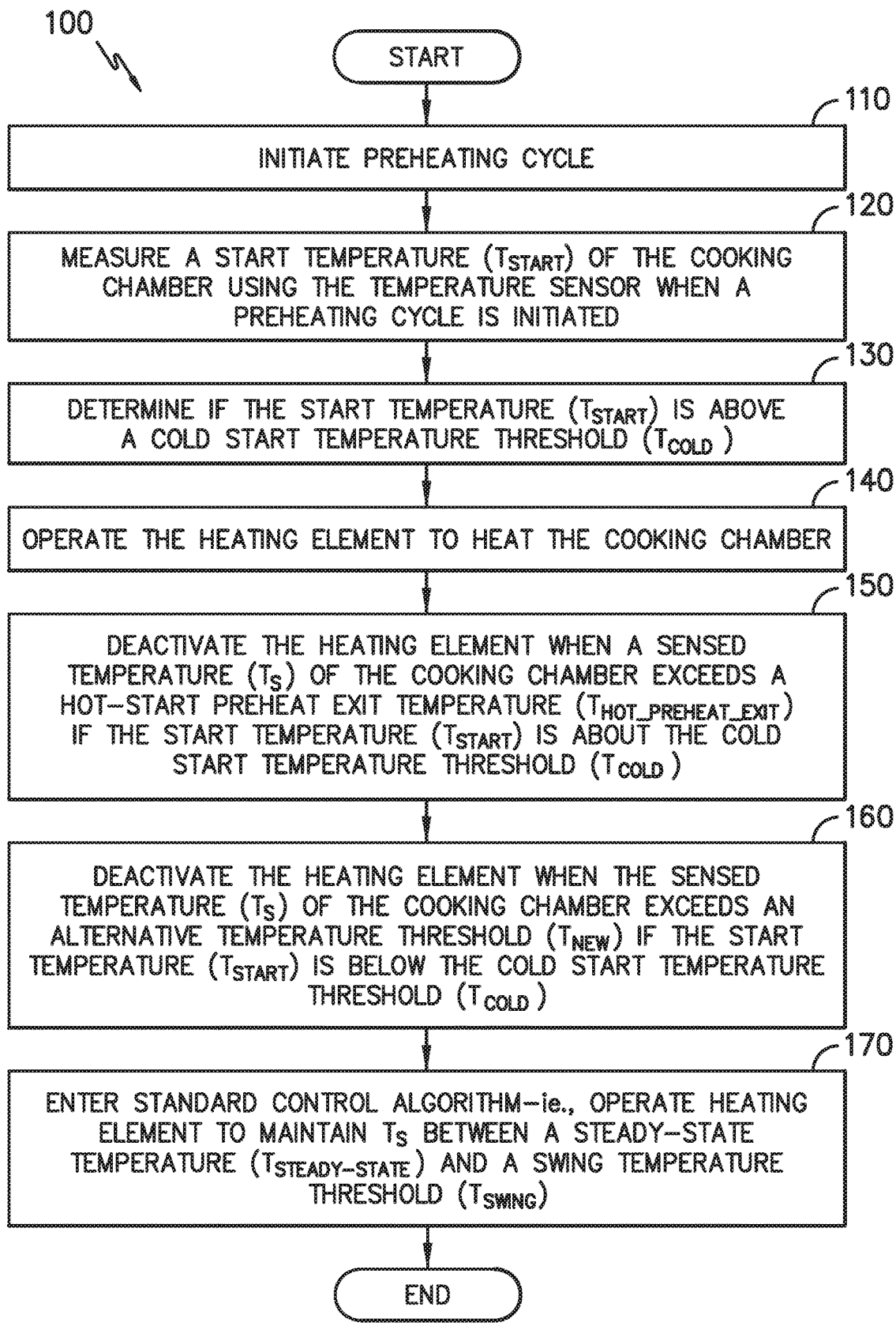
FIG. -4-

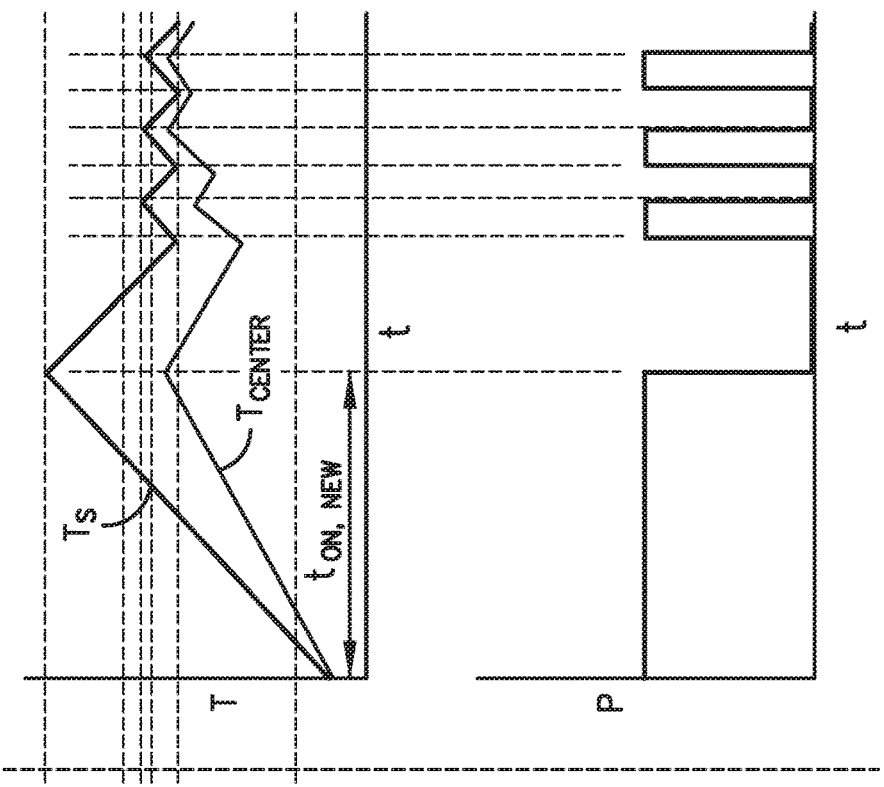
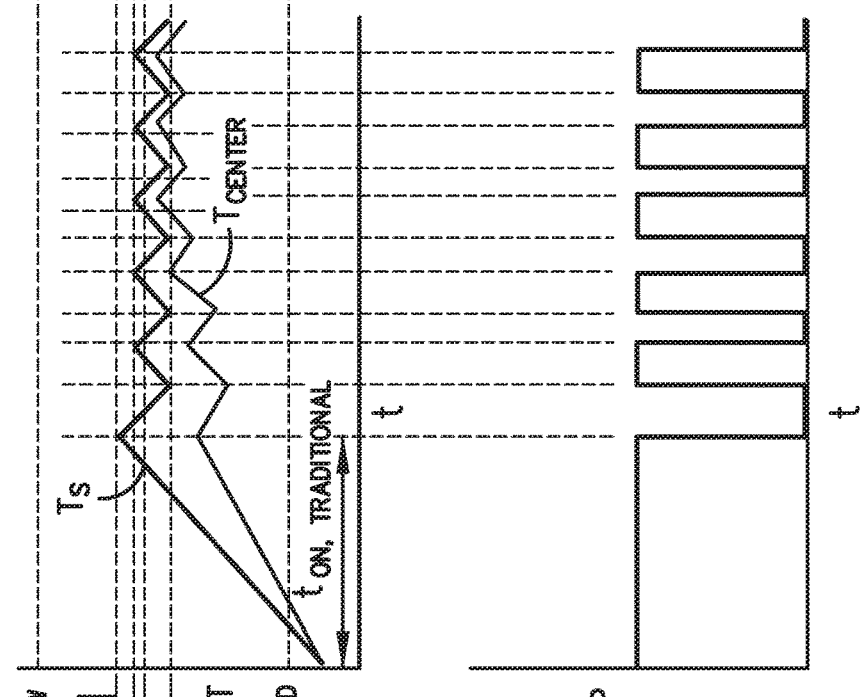
FIG. -5-

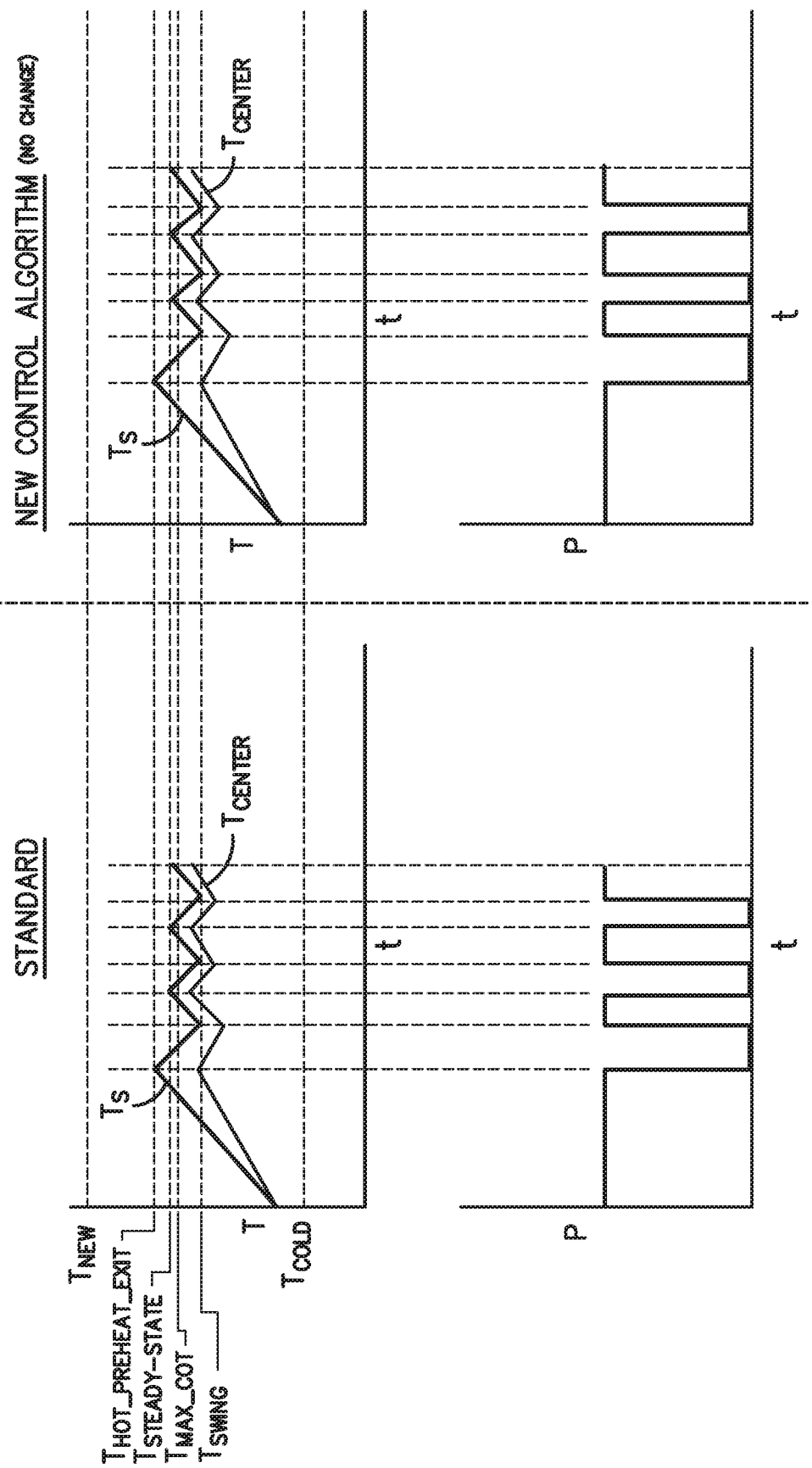
FIG. -6-

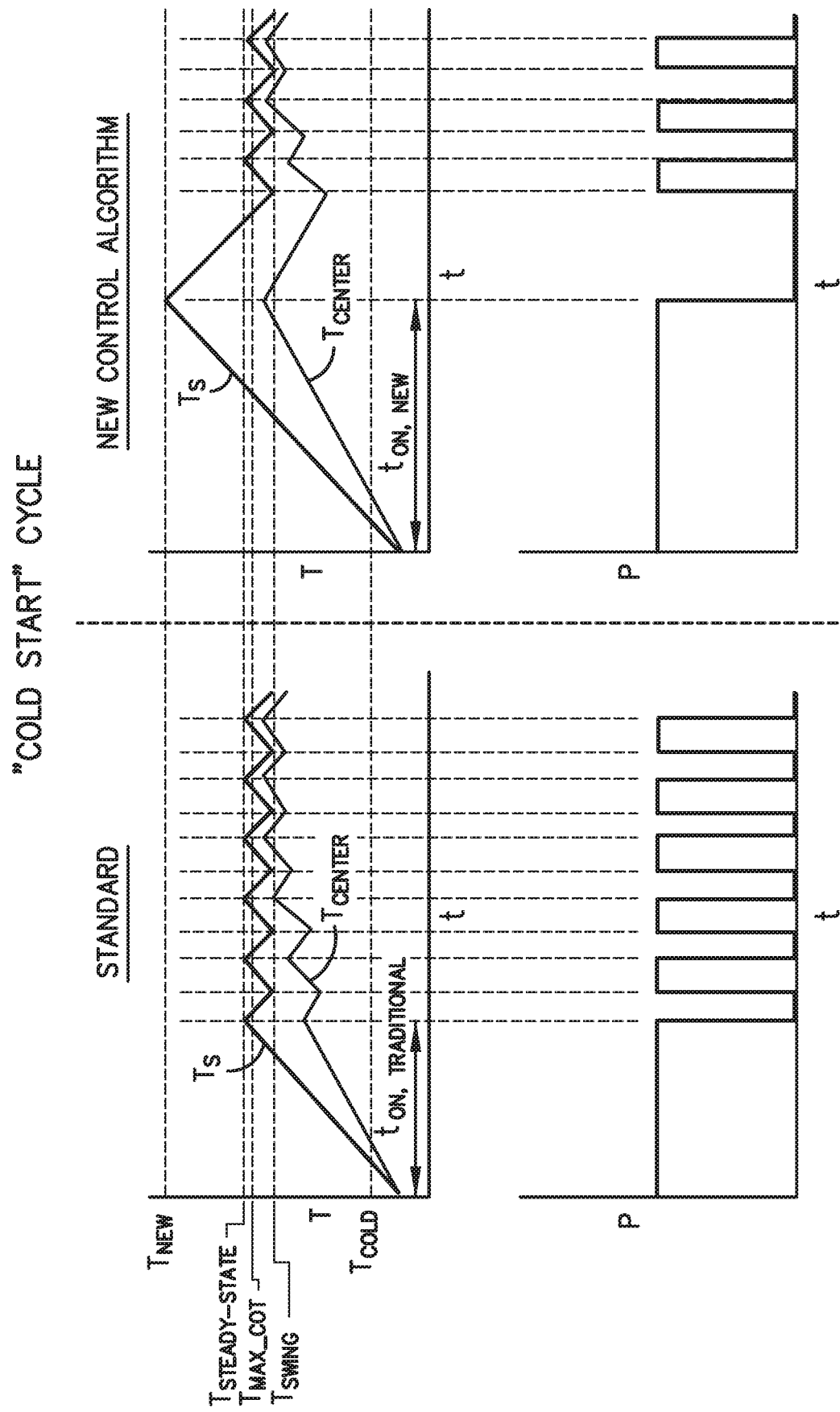
FIG. -7-

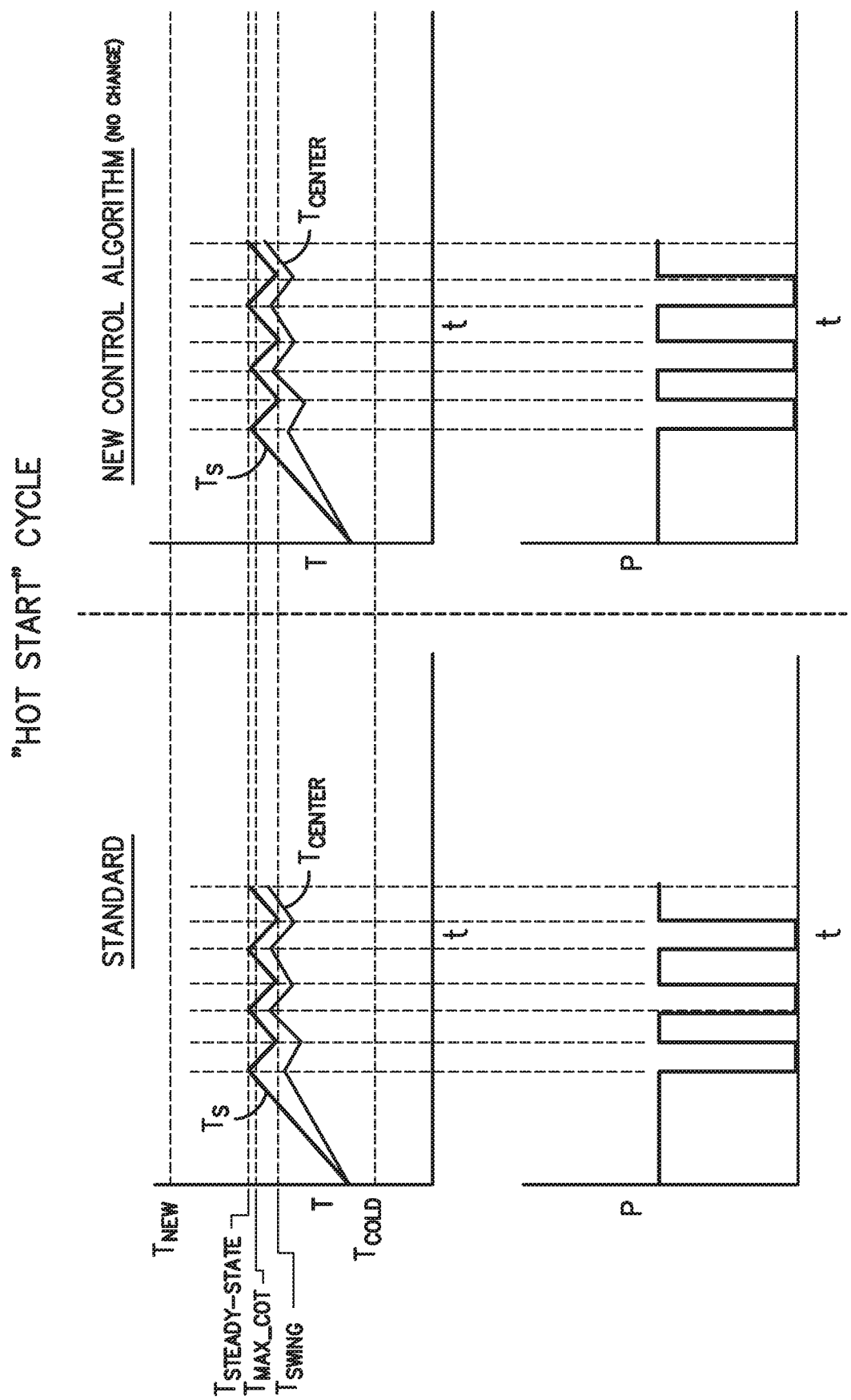
FIG. -8-

CONTROL METHOD FOR OVEN BROILING

FIELD OF THE INVENTION

The present disclosure relates generally to an oven appliance, or more specifically, to a method for improving broil performance in an oven appliance.

BACKGROUND OF THE INVENTION

Oven appliances generally include a cabinet that defines a cooking chamber for receipt of food items for cooking. Heating elements are positioned within the cooking chamber to provide heat to food items located therein. The heating elements can include a bake heating element positioned at a bottom of the cooking chamber and/or a broil heating element positioned at a top of the cooking chamber. Oven appliances may also include a convection heating assembly, which may include a convection heating element and fan or other mechanism for creating a flow of heated air within the cooking chamber.

During operation of oven appliances, one of more heating elements may be energized to heat the cooking chamber to a selected cooking temperature. During this preheating operation, it is common for oven appliances to operate according to control algorithms that turn off the heating elements when predetermined limits on the oven temperature are reached. More specifically, the control algorithms may attempt to turn off the heating elements before a sensed temperature indicates that the center oven temperature exceeds a maximum desired temperature threshold.

The temperature of the cooking chamber is often measured by a temperature sensor placed on the top or in the back of the cooking chamber. While the oven is heating, the relationship between the center oven temperature and the sensed temperature varies, particularly when the cooking chamber is initially cold. For example, when the broil heating element located in the top of the cooking chamber is energized, the sensed temperature may be significantly higher than the actual center oven temperature. More importantly, the sensed temperature may exceed the maximum desirable temperature threshold before the actual center oven temperature. As a result, the control algorithm may turn off the broil heating element sooner than required when started from a cold condition, thereby harming cooking performance.

Accordingly, an oven appliance that provides improved broil performance during the preheating cycle would be useful. More particularly, a control method that allows the heating element to remain on longer during a cold-start preheat cycle while maintaining the center oven temperature within desired limits would be especially beneficial.

BRIEF DESCRIPTION OF THE INVENTION

The present subject matter provides a system and method for preheating a cooking chamber of an oven appliance. The oven appliance may include one or more heating elements that operate according to a control algorithm that prevents the center oven temperature from exceeding a maximum desired temperature threshold. The control algorithm accounts for discrepancies between the measured oven temperature and the actual center oven temperature, particularly when preheating a cold oven. As a result, the control algorithm selectively operates one or more of the heating elements after the measured oven temperature is above the maximum desired temperature threshold. Preheating the cooking chamber in this manner will improve overall cooking performance. Additional aspects and advantages of the invention will be set forth in part in the following description, may be apparent from the description, or may be learned through practice of the invention.

In one exemplary embodiment, a method for preheating an oven appliance is provided. The oven appliance includes a cooking chamber for receiving food items for cooking, a heating element positioned within the cooking chamber, and a temperature sensor positioned within the cooking chamber. The method includes measuring a start temperature of the cooking chamber using the temperature sensor when a preheating cycle is initiated and determining if the start temperature is above a cold start temperature threshold. The heating element is then operated to heat the cooking chamber. The heating element is deactivated when a measured temperature of the cooking chamber exceeds a hot-start preheat exit temperature threshold if the start temperature is above the cold start temperature threshold and is deactivated when the measured temperature of the cooking chamber exceeds an alternative preheat exit temperature threshold if the start temperature is below the cold start temperature threshold.

In another exemplary embodiment, an oven appliance is provided. The oven appliance includes a cooking chamber for receiving food items for cooking, a heating element positioned within the cooking chamber, a temperature sensor positioned within the cooking chamber; and a controller configured to preheat the oven appliance. The controller measures a start temperature and determines if the start temperature exceeds a cold start threshold. The heating element is operated according to a first heating routine if the start temperature exceeds the cold start threshold and according to a second heating routine if the start temperature is below the cold start threshold. The first heating routine includes cycling the heating element on and off at measured temperatures correlating to a maximum desired center oven temperature and a lower swing temperature. The second heating routine includes energizing the heating element until an overheat temperature is exceeded, and then cycling the heating element according to the first heating routine.

In still another exemplary embodiment, a method for preheating an oven appliance is provided. The oven appliance includes a cooking chamber for receiving food items for cooking, a heating element positioned within the cooking chamber, and a temperature sensor positioned within the cooking chamber. The method includes measuring a start temperature of the cooking chamber using the temperature sensor when a preheating cycle is initiated. A hot start heating routine is initiated if the start temperature is above a cold start threshold. The hot start heating routine includes activating the heating element and repeatedly cycling the heating element off when a measured temperature of the cooking chamber exceeds a steady-state temperature threshold and on when the measured temperature drops a predetermined amount below the steady-state temperature threshold. A cold start heating routine is initiated if the start temperature is below the cold start threshold. The cold start heating routine includes activating the heating element and deactivating the heating element when the measured temperature of the cooking chamber exceeds an alternative temperature threshold. The alternative temperature threshold is higher than the steady-state temperature threshold.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides a perspective view of an oven appliance according to an exemplary embodiment of the present subject matter.

FIG. 2 provides a sectional view of the oven appliance of FIG. 1 taken along the line 2-2 of FIG. 1.

FIG. 3 is a schematic diagram of an oven appliance according to an exemplary embodiment of the present subject matter.

FIG. 4 illustrates a method for operating an oven appliance according to an exemplary embodiment of the present disclosure.

FIG. 5 is a plot of the measured oven temperature, the actual center oven temperature, and the power supplied to the heating element when the oven appliance is operated according to the exemplary method of FIG. 4 and when the oven is cold when the preheating cycle is initiated.

FIG. 6 is a plot of the measured oven temperature, the actual center oven temperature, and the power supplied to the heating element when the oven appliance is operated according to the exemplary method of FIG. 4 and when the oven is hot when the preheating cycle is initiated.

FIG. 7 is a plot of the measured oven temperature, the actual center oven temperature, and the power supplied to the heating element when the oven appliance is operated according to the exemplary method of FIG. 4 (with alternative temperature thresholds) and when the oven is cold when the preheating cycle is initiated.

FIG. 8 is a plot of the measured oven temperature, the actual center oven temperature, and the power supplied to the heating element when the oven appliance is operated according to the exemplary method of FIG. 4 (with alternative temperature thresholds) and when the oven is hot when the preheating cycle is initiated.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIGS. 1 and 2 depict an exemplary oven appliance 10 that may be configured in accordance with aspects of the present disclosure. FIG. 1 provides a perspective view of oven appliance 10 according to an exemplary embodiment of the present subject matter. FIG. 2 provides a cross sectional view of oven appliance 10 taken along the 2-2 line of FIG. 1. For the particular embodiment of FIGS. 1 and 2, oven appliance 10 defines a vertical direction V, a lateral direction L and a transverse direction T. The vertical, lateral and transverse directions are mutually perpendicular and form an orthogonal direction system. As will be understood by those skilled in the art, oven appliance 10 is provided by way of example only, and the present subject matter may be used in any suitable cooking appliance. Thus, the present subject matter may be used with other oven appliances having different configurations, such as wall ovens, electric ovens, gas ovens, microwave ovens, etc.

Oven appliance 10 includes an insulated cabinet 12 with an interior cooking chamber 14 defined by an interior surface 15 of cabinet 12. Cooking chamber 14 is configured for the receipt of one or more food items to be cooked. Oven appliance 10 includes a door 16 rotatably mounted to cabinet 12, e.g., with a hinge (not shown). A handle 18 is mounted to door 16 and assists a user with opening and closing door 16 in order to access cooking chamber 14. For example, a user can pull on handle 18 to open or close door 16 and access cooking chamber 14.

Oven appliance 10 can include a seal (not shown) between door 16 and cabinet 12 that assists with maintaining heat and cooking fumes within cooking chamber 14 when door 16 is closed as shown in FIG. 2. Multiple parallel glass panes 22 provide for viewing the contents of cooking chamber 14 when door 16 is closed and assist with insulating cooking chamber 14. A baking rack 24 is positioned in cooking chamber 14 for the receipt of food items or utensils containing food items. Baking rack 24 is slidably received onto embossed ribs 26 or sliding rails such that rack 24 may be conveniently moved into and out of cooking chamber 14 when door 16 is open.

As shown, various sidewalls define the cooking chamber 14. For example, cooking chamber 14 includes a top wall 30 and a bottom wall 32 which are spaced apart along the vertical direction V. Left sidewall 34 and right sidewall 36 (as defined according to the view as shown in FIG. 1) extend between the top wall 30 and bottom wall 32, and are spaced apart along the lateral direction L. A rear wall 38 may additionally extend between the top wall 30 and bottom wall 32 as well as between the left sidewall 34 and right sidewall 36, and is spaced apart from the door 16 along the transverse direction T. Cooking chamber 14 is thus defined between the top wall 30, bottom wall 32, left sidewall 34, right sidewall 36, and rear wall 38.

A lower heating assembly, e.g., bake heating assembly 40, may be included in oven appliance 10, and may include one or more heating elements, e.g. bake heating elements 42. Bake heating elements 42 may be disposed within the cooking chamber 14, such as adjacent bottom wall 32. In exemplary embodiments as illustrated, the bake heating elements 42 are electric heating elements, as is generally understood. Alternatively, the bake heating elements 42 may be gas burners or other suitable heating elements having other suitable heating sources. Bake heating elements 42 may generally be used to heat cooking chamber 14 for both cooking and cleaning of oven appliance 10.

Additionally, an upper heating assembly, e.g., broil heating assembly 46, may be included in oven appliance 10, and may include one or more upper heating elements, e.g., broil heating elements 48. Broil heating elements 48 may be disposed within the cooking chamber 14, such as adjacent top wall 30. In exemplary embodiments as illustrated, the broil heating elements 48 are electric heating elements, as is generally understood. Alternatively, the broil heating elements 48 may be gas burners or other suitable heating elements having other suitable heating sources. Broil heating elements 48 may additionally generally be used to heat cooking chamber 14 for both cooking and cleaning of oven appliance 10.

Oven appliance 10 may also include a convection heating assembly 50. Convection heating assembly 50 may have a fan 52 and a convection heating element 54. Convection heating assembly 50 is configured for selectively urging a flow of heated air into cooking chamber 14. For example, fan 52 can pull air from cooking chamber 14 into convection heating assembly 50 and convection heating element 54 can heat such air. Subsequently, fan 52 can urge such heated air back into cooking chamber 14. As another example, fan 52 can cycle heated air from cooking chamber 14 within cooking chamber 14 in order to generate forced convective air currents without use of convection heating element 54. Like heating elements 42, 48 discussed above, convection heating element 54 may be, e.g., a gas, electric, or microwave heating element or any suitable combination thereof. According to an alternative exemplary embodiment, convection heating assembly 50 need not include fan 52.

Oven appliance 10 is further equipped with a controller 58 to regulate operation of the oven appliance 10. For example, controller 58 may regulate the operation of oven appliance 10 including heating elements 42, 48, 54 (and heating assemblies 40, 46, 50 generally). Controller 58 may be in communication (via for example a suitable wired or wireless connection) with the heating elements 42, 48, 54 and other suitable components of the oven appliance 10, as discussed herein. In general, controller 58 may be operable to configure the oven appliance 10 (and various components thereof) for cooking. Such configuration may be based on a plurality of cooking factors of a selected operating cycle, as discussed herein.

By way of example, controller 58 may include one or more memory devices and one or more microprocessors, such as general or special purpose microprocessors operable to execute programming instructions or micro-control code associated with an operating cycle. The memory may represent random access memory such as DRAM, or read only memory such as ROM or FLASH. In one embodiment, the processor executes programming instructions stored in memory. The memory may be a separate component from the processor or may be included onboard within the processor.

Controller 58 may be positioned in a variety of locations throughout oven appliance 10. In the illustrated embodiment, controller 58 may be located within a user interface panel 60 of oven appliance 10 as shown in FIGS. 1 and 2. In such an embodiment, input/output ("I/O") signals may be routed between the control system and various operational components of oven appliance 10 along wiring harnesses that may be routed through cabinet 12. Typically, controller 58 is in communication with user interface panel 60 and controls 62 through which a user may select various operational features and modes and monitor progress of oven appliance 10. In one embodiment, user interface 60 may represent a general purpose I/O ("GPIO") device or functional block. In one embodiment, user interface 60 may include input components, such as one or more of a variety of electrical, mechanical or electro-mechanical input devices including rotary dials, push buttons, and touch pads. User interface 60 may include a display component, such as a digital or analog display device 64 designed to provide operational feedback to a user.

User interface 60 may be in communication with controller 58 via one or more signal lines or shared communication busses. Controller 58 may also be communication with one or more sensors, e.g., a temperature sensor 66 that is used to measure temperature inside cooking chamber 14 and provide such measurements to controller 58. Temperature sensor 66 may be a thermocouple, a thermistor, a resistance temperature detector, or any other device suitable for measuring the temperature within cooking chamber 14.

Temperature sensor 66 is shown (in FIG. 2) in the top and rear of cooking chamber 14. However, other locations may be used and, if desired, multiple temperature sensors may be applied as well. In this manner, controller 58 may operate heating elements 42, 48, 54 in response to user manipulation of user interface panel 60 and temperature feedback from temperature sensor 66. Controller 58 can also receive temperature measurements from temperature sensor 66 placed within cooking chamber 14 and e.g., provide a temperature indication to the user with display 64.

It should be appreciated that the invention is not limited to any particular style, model, or configuration of oven appliance 10. The exemplary embodiment depicted in FIGS. 1 and 2 is for illustrative purposes only. For example, different locations may be provided for user interface 60, different configurations may be provided for rack 24 or ribs 26, and other differences may be applied as well. In addition, the oven appliance 10 may be a wall oven, an oven/range combo, a microwave oven, an electric oven, a gas oven, etc.

Referring now to FIG. 3, a schematic view of oven appliance 10 is illustrated. As illustrated, controller 58 may be operatively coupled to or in communication with user interface panel 60, heating assemblies 40, 46, 50, temperature sensor 66, and other components of oven appliance 10. More particularly, controller 58 is operatively coupled to or in communication with bake heating element 42, broil heating element 48, fan 52, and/or convection heating element 54, and may operate these elements, e.g., in response to user manipulation of user interface panel 60 and/or temperature feedback from temperature sensor 66. The preheat operation of oven appliance 10 may be regulated by controller 58 in a manner described in greater detail below. More particularly, aspects of the present disclosure are directed to operation of one or more of heating elements 42, 48, 54 to improve cooking performance, particularly broil performance.

Oven appliance 10 may be powered by mains electricity, e.g., at 240V. However, because not all components of oven appliance 10 may operate at 240V, voltage regulation may be achieved using any suitable voltage-adjusting device. For example, a triode for alternating current ("TRIAC") may be used to reduce the mains electricity, e.g., 240V, to a lower voltage for powering some of the oven appliance 10 components. By dividing the power in this manner, the total voltage supplied to each of bake heating element 42, broil heating element 48, and convection heating element 54 can be adjusted by selectively coupling each element to power sources having different voltages. By energizing different heating elements at different voltages for different time periods, heating system 100 may operate according to heating routines that optimize heating efficiency, decrease the total preheat time of oven appliance 10, and improve cooking performance. One skilled in the art will appreciate that the voltages described herein are only exemplary, and may be higher or lower depending on the needs of the application. Indeed, any number of power sources providing power at any voltage may be achieved by using suitable electronics.

Now that the construction and configuration of oven appliance 10 according to an exemplary embodiment of the present subject matter have been presented, an exemplary method 100 of preheating oven appliance 10 will be described. FIG. 4 illustrates method 100 for operating an appliance, such as oven appliance 10, according to exemplary embodiments of the present subject matter. It should be understood that method 100 may be used in other oven appliances as well, such as range appliances.

Method 100 is a method for preheating an appliance, e.g., oven appliance 10. In particular, method 100 facilitates improving the overall cooking performance of oven appliance 10, particularly closed door broiling performance. In this regard, the discussion below refers to performing method 100 using broil heating element 48. However, one skilled in the art will appreciate that method 100 may be used to control one or more of heating elements 42, 48, 54 in any combination. Controller 58 may be programmed to perform method 100, e.g., by selectively energizing heating elements 42, 48, 54 according to one or more heating routines.

For example, when preheating with broil heating element 48, conventional control algorithms turn off broil heating element 48 when the sensed temperature $T_S$ exceeds the steady-state temperature threshold $T_{STEADY-STATE}$. Notably, this temperature value is chosen so that the center oven temperature $T_{CENTER}$, inferred by correlation from temperature sensor 66, does not exceed a maximum desired temperature at any point during the broil operation. However, when the preheat cycle is initiated when cooking chamber 14 is cold, the correlation between the sensed temperature $T_S$ and the actual center oven temperature $T_{CENTER}$ is different than when cooking chamber 14 has preheated or thermally "soaked." As described below, method 100 accounts for this change in correlation by using a new alternative temperature threshold $T_{NEW}$ that is higher than the original $T_{STEADY-STATE}$ to initially operate broil heating element 48 to heat cooking chamber 14.

Method 100 may include, at step 110, initiating a preheating cycle. At step 120, a start temperature $T_{START}$ of cooking chamber 14 is measured using temperature sensor 66 when a preheating cycle is initiated. As discussed above, temperature sensor 66 is placed proximate top wall 30 of cooking chamber 14. Therefore, the temperature measured by temperature sensor 66 may not be equivalent to the center oven temperature $T_{CENTER}$.

According to an exemplary embodiment, broil heating element 48 may be energized to begin heating cooking chamber 14. Notably, temperature sensor 66 will frequently sense a higher temperature than the actual center oven temperature $T_{CENTER}$ due to its proximity to broil heating element 48, particularly if the cooking chamber 14 is at room temperature when the preheating cycle is initiated. Thus, the discrepancy between the sensed temperature $T_S$ and the center oven temperature $T_{CENTER}$ is typically largest when cooking chamber 14 is still cold, but broil heating element 48 has been energized and is heated. The difference between the sensed temperature $T_S$ and the center oven temperature $T_{CENTER}$ slowly decreases until the cooking chamber is thermally "soaked"—i.e., when all surfaces of cooking chamber 14 have been heated to their desired steady-state temperatures.

As explained above, the discrepancy between the sensed temperature $T_S$ and the center oven temperature $T_{CENTER}$ depends on the temperature of cooking chamber 14 at the start of a preheating cycle. Therefore, at step 130, method 100 includes determining if the start temperature $T_{START}$ is above a cold start temperature threshold $T_{COLD}$. According to the exemplary embodiment, the cold start temperature threshold $T_{COLD}$ may be 100° F. If the temperature at the initiation of a heating cycle $T_{START}$ is below cold start temperature threshold $T_{COLD}$, this may be considered a "cold start" cycle (see FIG. 5), and if the temperature at the initiation of a heating cycle $T_{START}$ is above cold start temperature threshold $T_{COLD}$, this may be considered a "hot start" cycle (see FIG. 6). As will be described below, according to an exemplary embodiment, controller 58 may implement different control algorithms for the preheating process depending on whether the cycle was a "cold start" cycle or a "hot start" cycle.

At step 140, a heating element, e.g., broil heating element 48 may be energized to begin heating cooking chamber 14. With broil heating element 48 activated, the temperature within cooking chamber 14 rises, as does the temperature sensed $T_S$ by temperature sensor 66. As explained above, broil heating element 48 is energized at 240 V. However, according to alternative embodiments, broil heating element 48, or any other heating element 42, 54, may be energized at any suitable voltage.

At step 150, if the start temperature $T_{START}$ is above the cold start temperature threshold $T_{COLD}$—i.e., during a "hot start" cycle—broil heating element 48 is deactivated when the sensed temperature $T_S$ of cooking chamber 14 exceeds a hot-start preheat exit temperature $T_{hot\_preheat\_exit}$. $T_{hot\_preheat\_exit}$ may be, for example, a predetermined temperature threshold that correlates to a center oven temperature that the cooking chamber 14 should not exceed, e.g., 600° F., for safety purposes. This method of operation, which occurs during a "hot start" cycle, is similar to steady-state operation of oven appliance 10.

By contrast, at step 160, if the start temperature $T_{START}$ is below the cold start temperature threshold $T_{COLD}$—i.e., during a "cold start" cycle—broil heating element 48 is deactivated when the sensed temperature $T_S$ of cooking chamber 14 exceeds an alternative temperature threshold $T_{NEW}$. According to an exemplary embodiment, the alternative temperature threshold $T_{NEW}$ may be a temperature higher than the hot-start preheat exit temperature $T_{hot\_preheat\_exit}$. Therefore, as discussed and illustrated below, if cooking chamber 14 is cold at the start of a cooking cycle, broil heating element 48 is allowed to heat the cooking chamber 14 even after the sensed temperature $T_S$ is above the hot-start preheat exit temperature $T_{hot\_preheat\_exit}$. In this manner, method 100 may be used to compensate for the correlation difference between the actual center oven temperature $T_{CENTER}$ and the sensed temperature $T_S$ in cold-start and hot-start conditions.

As described above, broil heating element 48 operates to heat cooking chamber 14 to a hot-start preheat exit temperature $T_{hot\_preheat\_exit}$ during a "hot start" cycle and to an alternative temperature threshold $T_{NEW}$ during a "cold start" cycle. However, one skilled in the art will appreciate that this control algorithm is only exemplary, and variations may be made to this algorithm while remaining within the scope of the present subject matter. For example, the alternative temperature threshold $T_{NEW}$ may be adjusted based on the heating element used, based on the starting temperature $T_{START}$ of cooking chamber 14, or based on whether oven door 16 is open or closed.

For example, the alternative temperature threshold $T_{NEW}$ to which broil heating element 48 heats cooking chamber 14 may be a variable temperature threshold $T_V$. More particularly, variable temperature threshold $T_V$ may vary in a manner that is inversely proportional to the start temperature $T_{START}$. In this manner, the hotter the sensed temperature $T_S$ of cooking chamber 14 upon initiation of a heating cycle $T_{START}$, the closer variable temperature threshold $T_V$ will be to the hot-start preheat exit temperature $T_{hot\_preheat\_exit}$. This may be desirable, for example, because the hotter cooking chamber 14 is at cycle initiation, the less the control algorithm needs to compensate for the correlation difference between the sensed temperature $T_S$ and the actual center oven temperature $T_{CENTER}$ in cold-start and hot-start conditions. One skilled in the art will appreciate that the control algorithm may vary in other manners depending on the needs of a particular application.

Operation of oven appliance 10 according to exemplary method 100 is illustrated in FIGS. 5 and 6. These figures provide plots of the power applied to broil heating element 48 and the resulting temperature profiles versus time, for each of a standard control algorithm and the new, proposed control algorithm. FIG. 5 illustrates operation during a "cold start" cycle and FIG. 6 illustrates operation during a "hot start" cycle. A comparison of the temperature profiles in FIG. 5 illustrates certain advantages of exemplary method 100 over the operation of a conventional oven appliance 10.

As explained above according to method 100, broil heating element 48 is deactivated when the sensed temperature $T_S$ exceeds $T_{hot\_preheat\_exit}$ during a "hot start" cycle and $T_{NEW}$ during a "cold start" cycle. However, this part of the heat cycle is only intended to maximize cooking performance during the preheat cycle by enabling operation of broil heating element 48 for a longer period of time while maintaining the actual center oven temperature $T_{CENTER}$ below the maximum desired center oven temperature $T_{MAX\_COT}$. After $T_S$ reaches these thresholds—i.e., after the preheat cycle is complete—broil heating element 48 is deactivated and the temperature in cooking chamber 14 begins to drop. However, controller 58 may then operate broil heating element 48 according to another heating routine. According to the exemplary embodiment, the second heating routine is a steady-state heating routine.

The steady-state heating routine is designed to keep the center oven temperature $T_{CENTER}$ at or below the maximum desired center oven temperature $T_{MAX\_COT}$. This is achieved at step 170 by cycling the broil heating element 48 off when the steady-state temperature $T_{STEADY-STATE}$ is reached and then back on when the temperature drops a predetermined amount below the steady-state temperature $T_{STEADY-STATE}$. This lower temperature threshold may be referred to as the swing temperature threshold $T_{SWING}$. By operating broil heating element 48 in this manner, the center oven temperature $T_{CENTER}$ may be maintained right around the maximum desired center oven temperature $T_{MAX\_COT}$.

Although the description above refers to the use of method 100 to preheat the oven appliance 10 using broil heating element 48, one skilled in the art will appreciate that method 100 may be applied to use with other heating elements 42, 54 as well. For example, a method 100 may be used to control a preheat operation using bake heating assembly 40, convection heating assembly 50, broil heating assembly 46, or some combination of each of these heating assemblies. Notably, the relationship between the center oven temperature $T_{CENTER}$ and the sensed temperature $T_S$ may vary depending on which heating element 42, 48, 54 is energized, but the algorithm may be adjusted accordingly to account for the differences in the relationship between the center oven temperature $T_{CENTER}$ and the sensed temperature $T_S$.

In addition, although method 100 describes controlling broil heating element 48 to avoid causing the center oven temperature $T_{CENTER}$ to exceed a maximum limit, e.g., the maximum desired center oven temperature $T_{MAX\_COT}$, one skilled in the art will appreciate that aspects of method 100 may be used in other cooking modes and in other manners depending on the application. For example, instead of controlling the maximum desired center oven temperature $T_{MAX\_COT}$, the control algorithm may control the center oven temperature $T_{CENTER}$ such that it does not exceed any other selected temperature or follows a predetermined temperature profile.

As illustrated in FIGS. 7 and 8, the above described oven appliance 10 and method 100 of operating oven appliance 10 can improve overall cooking performance. For example, when preheating with broil heating element 48, broil performance is, in part, directly related to the length of time that broil heating element 48 is powered. According to conventional control algorithms, broil heating element 48 is turned off when the sensed temperature $T_S$ exceeds the steady-state temperature threshold $T_{STEADY-STATE}$. Notably, this temperature value is chosen so that the center oven temperature $T_{CENTER}$, inferred by correlation from temperature sensor 66, does not exceed a maximum desired temperature at any point during the broil operation. By comparison to FIGS. 5 and 6, where broil heating element 48 is deactivated when the sensed temperature $T_S$ exceeds $T_{hot\_preheat\_exit}$ during a "hot start" cycle, broil heating element 48 is deactivated in FIGS. 7 and 8 when the sensed temperature $T_S$ exceeds $T_{STEADY-STATE}$. One skilled in the art will appreciate that these and other variations of the various temperature thresholds may be adjusted to optimize the cooking performance of oven appliance, and such variations are considered to be within the scope of the present subject matter.

However, when the preheat cycle is initiated when cooking chamber 14 is cold, the correlation between the sensed temperature $T_S$ and the actual center oven temperature $T_{CENTER}$ is different than when cooking chamber 14 has preheated or thermally "soaked." Method 100 accounts for this change in correlation by using a new alternative temperature threshold $T_{NEW}$ that is higher than the original $T_{STEADY-STATE}$ to initially operate broil heating element 48 to heat cooking chamber 14. In this manner, broil heating element 48 may operate for a longer time, introduce more heat in a shorter time, and improve overall broil performance. In addition, this improved performance may be achieved without the actual center oven temperature $T_{CENTER}$ exceeding the maximum desired temperature. After the sensed temperature of the cooking chamber 14 reaches $T_{NEW}$, broil heating element 48 is turned off, and the remainder of the cooking cycle is operated according to a steady-state heating routine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for preheating an oven appliance, the oven appliance comprising a cooking chamber for receiving food items for cooking, a heating element positioned within the cooking chamber, and a temperature sensor positioned within the cooking chamber, the method comprising:

initiating a preheating cycle by energizing a heating element;

measuring a start temperature of the cooking chamber using the temperature sensor when a preheating cycle is initiated;

determining that the start temperature is above a cold start temperature threshold, the cold start temperature threshold being greater than 100 degrees Fahrenheit;

obtaining a hot-start preheat exit temperature threshold in response to determining that the start temperature is above the cold start temperature threshold, wherein the hot-start preheat exit temperature threshold is different that an alternative preheat exit temperature threshold corresponding to a situation where the start temperature is below the cold start temperature threshold;

measuring a chamber temperature of the cooking chamber while heating the heating element is energizing; and deactivating the heating element when a measured temperature of the cooking chamber exceeds the hot-start preheat exit temperature threshold, or when the measured temperature of the cooking chamber exceeds an alternative preheat exit temperature threshold if the start temperature is below the cold start temperature threshold, wherein the alternative preheat exit temperature threshold is higher than the hot-start preheat exit temperature threshold.

2. The method of claim 1, wherein the heating element is a broil heating element operating at 240 volts.

3. The method of claim 1, wherein the method further comprises repeatedly cycling the heating element on when the measured temperature drops a predetermined amount below a steady-state temperature threshold and off when the measured temperature exceeds the steady-state temperature threshold.

4. The method of claim 3, wherein the steady-state temperature threshold correlates to a center oven temperature less than 600 degrees Fahrenheit.

5. The method of claim 1, wherein the alternative preheat exit temperature threshold is adjusted when a door of the oven appliance is open.

6. The method of claim 1, wherein the alternative preheat exit temperature threshold is variable, being inversely proportional to the start temperature.

7. The method of claim 1, further comprising:
determining that the start temperature is below the cold start temperature threshold; and
deactivating the heating element when the measured temperature of the cooking chamber exceeds the alternative preheat exit temperature threshold in response to determining that the start temperature is below the cold start temperature threshold.

8. A method for preheating an oven appliance, the oven appliance comprising a cooking chamber for receiving food items for cooking, a heating element positioned within the cooking chamber, and a temperature sensor positioned within the cooking chamber, the method comprising:

measuring a start temperature of the cooking chamber using the temperature sensor when a preheating cycle is initiated;

determining that the start temperature is above a predetermined cold start temperature threshold;

obtaining a hot-start preheat exit temperature threshold in response to determining that the start temperature is above the cold start temperature threshold, wherein the hot-start preheat exit temperature threshold is different that an alternative preheat exit temperature threshold corresponding to a situation where the start temperature is below the cold start temperature threshold;

energizing the heating element to begin heating the cooking chamber;

measuring a chamber temperature of the cooking chamber while heating the cooking chamber; and deactivating the heating element when the chamber temperature exceeds the hot-start preheat exit temperature threshold, or when the measured temperature of the cooking chamber exceeds an alternative preheat exit temperature threshold if the start temperature is below the cold start temperature threshold, wherein the alternative preheat exit temperature threshold is higher than the hot-start preheat exit temperature threshold.

9. The method of claim 8, wherein the cold start temperature threshold is 100 degrees Fahrenheit.

10. The method of claim 8, wherein the alternative temperature threshold is adjusted when a door of the oven appliance is open.

11. The method of claim 8, further comprising:
deactivating the heating element when the chamber temperature exceeds the alternative preheat exit temperature threshold if the start temperature is below the cold start temperature threshold, wherein the alternative preheat exit temperature threshold is higher than the hot-start preheat exit temperature threshold.

12. The method of claim 8, further comprising:
repeatedly cycling the heating element on when the chamber temperature drops a predetermined amount below a steady-state temperature threshold and off when the chamber temperature exceeds the steady-state temperature threshold.

13. The method of claim 12, wherein the steady-state temperature threshold correlates to a center oven temperature less than 600 degrees Fahrenheit.

* * * * *